Dec. 28, 1965        O. C. NORTON ETAL        3,225,853
CONTROL HANDLE FOR GOLF CART
Filed July 25, 1962
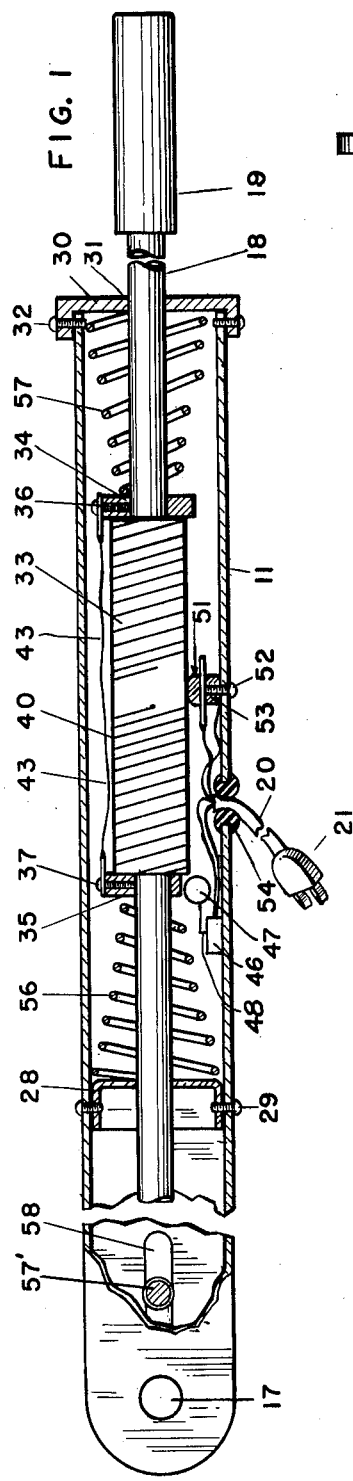
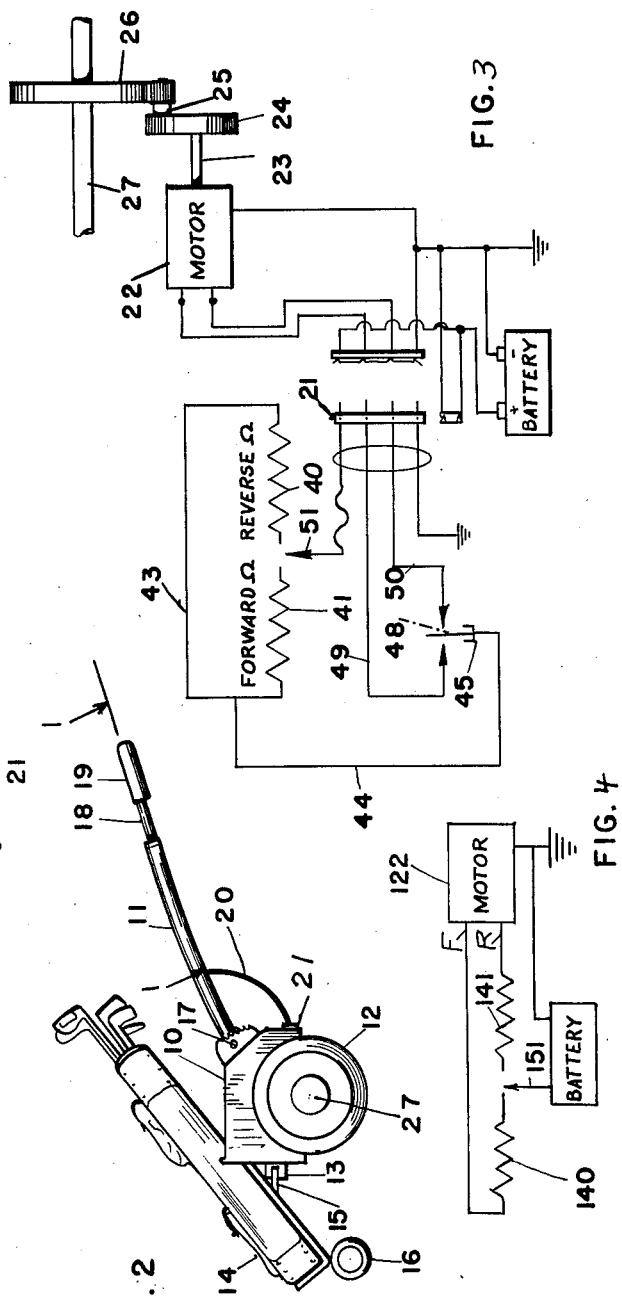
INVENTORS
ORLO CLAIR NORTON
JOSEPH SPITERI
BY WILL J. SCHAAF
Charles L. Lorenchuck
attorney

United States Patent Office 3,225,853
Patented Dec. 28, 1965

3,225,853
CONTROL HANDLE FOR GOLF CART
Orlo Clair Norton, 544 Virginia Ave., Erie, Pa., Joseph Spiteri, Erie, Pa., and Will J. Schaaf, 502 Seminole Drive, Erie, Pa.; said Spiteri assignor to said Schaaf and said Norton
Filed July 25, 1962, Ser. No. 212,356
2 Claims. (Cl. 180—19)

This invention relates to land vehicles and, more particularly, to golf carts.

The description herein is directed toward a golf cart; however, it will be readily seen by those skilled in the art that the control and vehicle disclosed are suitable for use to propel leaf rakers, lawn mowers, and various types of lawn, gardening, and estate type implements.

The ordinary golf cart has considerable weight and requires substantial energy to propel it over hilly terrain. This is exhausting to the golfer, especially if he is not in good physical condition. In any event, it detracts from the enjoyment of the game.

Various motor driven golf carts have been provided; however, the controls for these golf carts are not adapted to drive the golf carts forward and backward conveniently.

It is, accordingly, an object of the present invention to provide an improved golf cart.

Another object of the invention is to provide an improved combination golf cart and control means therefor.

A further object of the invention is to provide a golf cart and control therefor wherein the golf cart will move forward or backward, depending upon the direction it is pushed by the operator.

A still further object of the invention is to provide a golf cart which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a longitudinal cross sectional view of the handle of a golf cart according to the invention taken on line 1—1 of FIG. 2;

FIG. 2 is a side view of the cart;

FIG. 3 is a schematic electrical circuit to be used with the invention; and

FIG. 4 is another schematic electrical circuit.

Now with more particular reference to the drawing, FIGS. 1 to 3 show a golf cart 10 having a handle 11 and ground engaging wheels 12. A suitable adapter 13 is provided at the front of the cart to support a golf bag 14 thereon.

The wheels 12 can be any suitable type. They are preferably rubber tired and are attached to the sides of the golf cart 10 by a suitable axle. The adapter 13 may be of the type which can be used to adapt the cart to propel lawn mowers, grass seeders, cultivators, or the like.

The adapter 13 shown by way of example has a bifurcated front part which receives a tongue 15. The tongue 15 is attached to the golf bag holder. A suitable bolt may be extended through a vertically extending hole in the adapter 13 and the tongue 15 to hold the bag 14 thereon so that the bag can swing relative to the golf cart and, therefore, the device can be steered by the hand of the operator.

The golf bag 14 itself has wheels 16 thereon which carry the front part of the golf bag and serve to steer it over the ground.

The handle 11 is pivotally supported on the golf cart 10 at 17 and it has a rod 18 fixed thereto which has a hand grip 19 as will be explained hereinafter. The rod 18 telescopes in the handle 11 when the hand grip 19 is pushed forward or rearward.

An electrical cord 20 has a plug 21 on the end thereof. This plug 21 can be plugged into a motor circuit in the golf cart. A motor 22 will be of a suitable electrical type having a shaft 23 connected to a gear 24. Gear 24 will drive a sprocket 25 which will, in turn, drive a gear 26. Gear 26 is locked to the axle 27.

The handle 11 is hollow and has a spacer 28 which is in the form of a cup shaped member which fits into the inside of the handle and is held in place by means of screws 29. A hole at the center of the spacer 28 receives the rod 18. The other end of the rod 18 is slidably received in a hole 31 in a cover member 30. The cover member is attached to the handle 11 by means of screws 32.

A rheostat 33 has two spaced elements with a dead space therebetween. The rheostat is generally cylindrical in form and hollow and has the spaced element members 34 and 35 thereon. These element members support the cylindrical variable resistor 33 and are held to the rod 18 by means of screws 36 and 37.

The outer ends of windings 40 and 41 of the rheostat 33 are connected to a wire 43. Wire 43 is connected to a wire 44 which is, in turn, connected to a common position 45 on a switch 46.

The switch 46 is a single throw, double pole type having a neutral position. When the golf cart is at rest, a switch lever 48 is in the position shown in FIG. 3 and a detent 47 rests on the stepped spaced element 35 and a slider 51 is out of contact with the ends of the windings 40 and 41. Therefore, no power is being conducted to the motor 22 from the battery.

When the operator pulls back on the rod 18, a spring 57 is compressed while a spring 56 expands. The winding 40 moves under the slider 51 and the stepped spaced element 35 moves from under the detent 47, thereby allowing the switch lever 48 to close to the right hand position connecting the battery to the reverse winding of the motor. As the operator continues to increase the force on the hand grip 19, the spring 57 will be further compressed and a lesser amount of the winding 41 will be connected in series with the motor and battery and, therefore, the motor will be depressed at a faster rate. When the operator releases the force on the hand grip 19, the spring 57 will push the resistor 33 to the neutral position shown in FIG. 1.

When the operator decides to drive the cart forward, he will push upward on the hand grip 19. This will compress the spring 56 and cause the detent 47 to ride up onto the body of slide wire resistor 33. This will close the switch lever 48 to the other position and move the slider 51 onto the winding 41. This will connect the forward winding of the motor 22 to the battery through the winding 41 and drive the cart in a forward direction. The detent 47 will be made of a non-conductor of electricity and will, therefore, not interfere with the winding 40.

Wires 49 and 50 are connected to the winding of motor 22 and they are, in turn, connected to the windings 40 and 41 when the hand grip 19 is moved to the proper position.

The slider 51 is fixed to the handle 11 by a screw 52. The slider 51 is insulated from the handle 11 by an insulating spacer 53. The cord 20 extends through an opening in the side of the handle 11 and is insulated therefrom by means of a rubber grommet 54.

The resistor 33 is biased to the neutral position shown with the slider 51 on the dead spot or blank space between the element members 34 and 35. Springs 56 and 57 have large spaces which rest on the members 28 and 30, respectively. Their helical turns decrease in size in a direction toward the resistor, the small ends of each spring engaging one of the members 34 and 35.

The rod 18 has a pin 57' in the end thereof and this pin is received in a slot 58 in the handle 11. When the handle is pushed forward or backward, the pin 57' can slide therein. The switch 46 is a single pole switch having lever 48 attached thereto. The lever 48 has a roller thereon. The roller moves under a member when the handle 11 is pushed forward. When the handle is pushed forward, the body of resistor 33 will overrun the roller and push the switch to the position to drive the motor forward. When the handle 11 is pulled back for the reverse position, the body of resistor 33 will move off of the wheel on the lever 48 and the switch 46 will move to the reverse position to drive the golf cart in reverse.

In the embodiment of the invention shown in FIG. 4, a motor 122 is connected through suitable gearing to the axle of a cart such as shown in FIG. 3.

The motor 122 is driven by the battery shown which has one terminal connected to the grounded side of the motor. The other side of the motor has a forward terminal indicated at F and a reverse terminal indicated at R. The terminal F is connected to a resistor 140 and the terminal R is connected to a resistor 141. The battery is connected to a slider 151 similar to the slider 51 shown in FIG. 1.

When the handle of the cart is in the neutral position, the slider 151 will be at the open space between the two resistors 140 and 141. When the handle is pushed forward, the resistor 141 will be pushed up over the slider 151 and the cart will be driven forward. When the handle is pulled backward, the slider 151 will slide up onto the resistor 140 and the cart will be driven backward by the motor 122. Therefore, regardless of whether the operator walks forward or backward, the cart will always move along with him so long as he exerts a force on the handle in that direction.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A vehicle having ground engaging wheels thereon,
a reversible motor having reversing means therein operatively connected to drive at least one of said wheels,
means for supplying power to said motor,
control means to selectively drive said motor forward and in reverse,
said control means comprising a variable resistor having a first and a second spaced resistance element with a dead space therebetween and a movable element,
means connecting said power supplying means to said movable element,
means connecting said resistance elements remote from said dead space to said reversing means of said motor,
a handle on said vehicle,
said handle having a first and a second part telescopically movable relative to each other,
one of said first and second parts of said handle comprising a hand engaging member,
said variable resistor being disposed on a part of said handle,
said movable element being connected to said second part of said hand engaging member and slidable relative to said first part of said hand engaging member,
and balanced spring means biasing said parts of said hand engaging member to bring said movable element to rest on said dead space between said resistance elements,
said resistance elements moving to bring said movable element into engagement with said first resistance element to drive said vehicle in a first direction when said handle is pushed,
said resistance element moving to bring said movable element into engagement with said second resistance element when said handle is pulled,
said movable element being movable relative to said resistance elements toward said connections of said resistance elements to said motor against the force of said spring means in proportion to the force exerted on said handle to reduce the amount of resistance thereof between said power supplying means and said motor whereby said motor is driven faster as said resistance is decreased.

2. A vehicle having ground engaging wheels thereon,
a reversible motor on said vehicle operatively connected to at least one said wheel,
said motor having forward drive means thereon to drive said vehicle forward and reverse drive means to drive said vehicle in reverse,
power supply means on said vehicle,
a handle on said vehicle,
said handle having a first and a second part telescopically movable relative to each other,
one of said first and second parts of said handle comprising a hand engaging member,
a control means on said handle,
said control means comprising a common element connected to said power supply means and supported on said first part of said handle and slidable relative to said second part of said handle,
a first control element and a second control element on said second part of said handle spaced from each other with a dead space therebetween,
said first control element being connected to said forward drive means and said second control element being connected to said reverse drive means,
and balancing spring means biasing said control means to bring said common element to rest in said dead space when no force is exerted on said hand engaging member,
said common element being in movable engagement with said first control element when said handle is pushed and in movable engagement with said second control element when said handle is pulled,
said control elements each comprising means to supply power to said motor from said power supply means in proportion to the force exerted on said hand engaging member.

References Cited by the Examiner

UNITED STATES PATENTS

| | | | |
|---|---|---|---|
| 1,853,798 | 4/1932 | Brownell | 338—129 |
| 2,138,239 | 11/1938 | Irgens | 180—19 |
| 2,706,008 | 4/1955 | Voight | 180—19 |
| 2,879,858 | 3/1959 | Thomas | 180—19 |
| 2,937,706 | 5/1960 | Chandler | 180—19 |

A. HARRY LEVY, *Primary Examiner.*

BENJAMIN HERSH, *Examiner.*